(12) United States Patent
Suciu et al.

(10) Patent No.: US 7,882,694 B2
(45) Date of Patent: Feb. 8, 2011

(54) VARIABLE FAN INLET GUIDE VANE ASSEMBLY FOR GAS TURBINE ENGINE

(75) Inventors: Gabriel L. Suciu, Glastonbury, CT (US); Brian Merry, Andover, CT (US); James W. Norris, Lebanon, CT (US); Steven J. Sirica, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 432 days.

(21) Appl. No.: 11/719,143

(22) PCT Filed: Dec. 1, 2004

(86) PCT No.: PCT/US2004/040152

§ 371 (c)(1),
(2), (4) Date: May 11, 2007

(87) PCT Pub. No.: WO2006/060000

PCT Pub. Date: Jun. 8, 2006

(65) Prior Publication Data

US 2009/0074568 A1     Mar. 19, 2009

(51) Int. Cl.
*F02K 3/02* (2006.01)
(52) U.S. Cl. .................................................. 60/226.1
(58) Field of Classification Search ............... 60/226.1, 60/794; 415/159–162
See application file for complete search history.

(56) References Cited

U.S. PATENT DOCUMENTS

| | | | |
|---|---|---|---|
| 1,544,318 A | 6/1925 | Hodgkinson | |
| 2,221,685 A | 11/1940 | Smith | |
| 2,337,861 A * | 12/1943 | Adamtchik | 415/159 |
| 2,414,410 A | 1/1947 | Griffith | |
| 2,499,831 A | 3/1950 | Palmatier | |
| 2,548,975 A | 4/1951 | Hawthorne | |
| 2,611,241 A | 9/1952 | Schulz | |
| 2,620,554 A | 12/1952 | Mochel et al. | |
| 2,698,711 A | 1/1955 | Newcomb | |
| 2,801,789 A | 8/1957 | Moss | |
| 2,830,754 A | 4/1958 | Stalker | |
| 2,874,926 A | 2/1959 | Gaubatz | |
| 2,989,848 A | 6/1961 | Paiement | |
| 3,009,630 A | 11/1961 | Busquet | |
| 3,037,742 A | 6/1962 | Dent et al. | |
| 3,042,349 A | 7/1962 | Pirtle et al. | |
| 3,081,597 A | 3/1963 | Kosin et al. | |

(Continued)

FOREIGN PATENT DOCUMENTS

DE            767704            5/1953

(Continued)

*Primary Examiner*—Michael Cuff
*Assistant Examiner*—Phutthiwat Wongwian
(74) *Attorney, Agent, or Firm*—Carlson, Gaskey & Olds, P.C.

(57) ABSTRACT

A turbine engine includes a plurality of variable fan inlet guide vanes. Where the turbine engine is a tip turbine engine, the variable fan inlet guide vanes permit the ability to control engine stability even though the fan-turbine rotor assembly is directly coupled to the axial compressor at a fixed rate. The fan inlet guide vanes may be actuated from an inner diameter of the fan inlet guide vanes.

4 Claims, 2 Drawing Sheets

U.S. PATENT DOCUMENTS

| | | | |
|---|---|---|---|
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,887,297 A * | 6/1975 | Welchek ............. 415/161 |
| 3,932,813 A | 1/1976 | Gallant |
| 3,979,087 A | 9/1976 | Boris et al. |
| 3,990,810 A * | 11/1976 | Amos et al. ............. 415/161 |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,634,340 A * | 1/1987 | Stetter ............. 415/95 |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Liston et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |
| 2005/0241291 A1 * | 11/2005 | Bart et al. ............. 60/226.1 |

FOREIGN PATENT DOCUMENTS

| | | |
|---|---|---|
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |

| | | | | | |
|---|---|---|---|---|---|
| GB | 2016597 | 9/1979 | WO | 2006/059990 | 6/2006 |
| GB | 2026102 | 1/1980 | WO | 2006/059991 | 6/2006 |
| GB | 2095755 | 10/1982 | WO | 2006/059992 | 6/2006 |
| GB | 2191606 | 12/1987 | WO | 2006/059993 | 6/2006 |
| GB | 2229230 | 9/1990 | WO | 2006/059994 | 6/2006 |
| GB | 2265221 | 9/1993 | WO | 2006/059995 | 6/2006 |
| GB | 2401655 | 11/2004 | WO | 2006/059996 | 6/2006 |
| GB | 2410530 | 8/2005 | WO | 2006/059999 | 6/2006 |
| JP | 10184305 | 7/1998 | WO | 2006/060000 | 6/2006 |
| WO | 9902864 | 1/1999 | WO | 2006/060001 | 6/2006 |
| WO | 0127534 | 4/2001 | WO | 2006/060002 | 6/2006 |
| WO | 02081883 | 10/2002 | WO | 2006/060004 | 6/2006 |
| WO | 2004011788 | 2/2004 | WO | 2006/060005 | 6/2006 |
| WO | 2004022948 | 3/2004 | WO | 2006/060006 | 6/2006 |
| WO | 2004092567 | 10/2004 | WO | 2006/060009 | 6/2006 |
| WO | 2006/059968 | 6/2006 | WO | 2006/060010 | 6/2006 |
| WO | 2006/059969 | 6/2006 | WO | 2006/060011 | 6/2006 |
| WO | 2006/059971 | 6/2006 | WO | 2006/060012 | 6/2006 |
| WO | 2006/059972 | 6/2006 | WO | 2006/060013 | 6/2006 |
| WO | 2006/059973 | 6/2006 | WO | 2006/060014 | 6/2006 |
| WO | 2006/059974 | 6/2006 | WO | 2006/062497 | 6/2006 |
| WO | 2006/059975 | 6/2006 | WO | 2006059980 | 6/2006 |
| WO | 2006/059976 | 6/2006 | WO | 2006059990 | 6/2006 |
| WO | 2006/059977 | 6/2006 | WO | 2006060003 | 6/2006 |
| WO | 2006/059978 | 6/2006 | WO | 2006/059970 | 10/2006 |
| WO | 2006/059979 | 6/2006 | WO | 2006/110122 | 10/2006 |
| WO | 2006/059980 | 6/2006 | WO | 2006/059997 | 11/2006 |
| WO | 2006/059981 | 6/2006 | WO | 2006/110124 | 11/2006 |
| WO | 2006/059982 | 6/2006 | WO | 2006/110123 | 12/2006 |
| WO | 2006/059985 | 6/2006 | WO | 2006/112807 | 12/2006 |
| WO | 2006/059986 | 6/2006 | WO | 2006/110125 A3 | 2/2007 |
| WO | 2006/059987 | 6/2006 | WO | 2006/060003 A3 | 3/2007 |
| WO | 2006/059988 | 6/2006 | | | |
| WO | 2006/059989 | 6/2006 | | | |

* cited by examiner

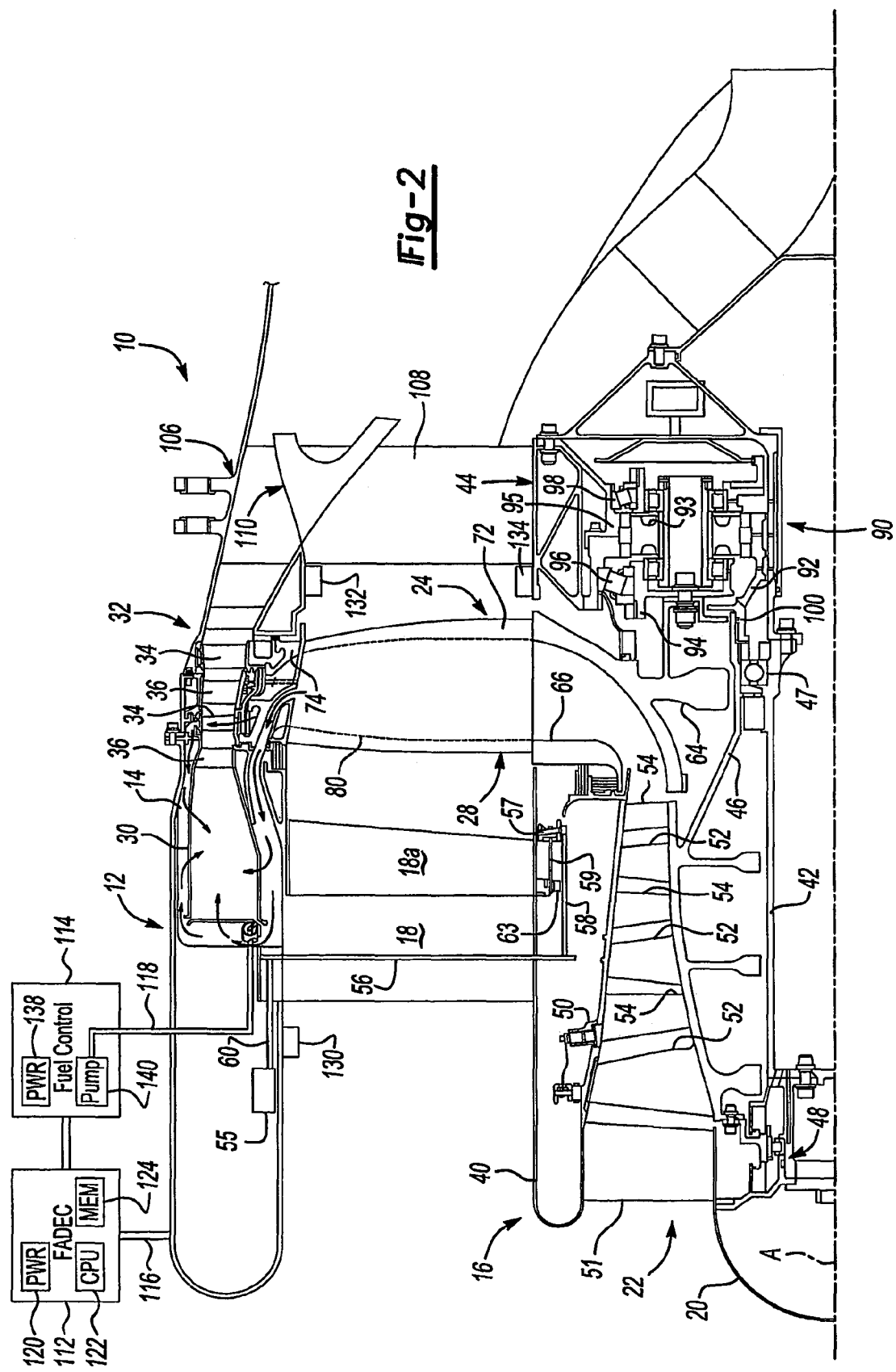

VARIABLE FAN INLET GUIDE VANE ASSEMBLY FOR GAS TURBINE ENGINE

This invention was conceived in performance of U.S. Air Force contract F33657-03-C-2044. The government may have rights in this invention.

BACKGROUND OF THE INVENTION

The present invention relates to turbine engines, and more particularly to a variable fan inlet guide vane for a turbine engine, such as a tip turbine engine.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines may include a low pressure axial compressor directing core airflow into hollow fan blades. The hollow fan blades operate as a centrifugal compressor when rotating. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

Some low bypass ratio conventional turbine engines include variable fan inlet guide vanes. The variable fan inlet guide vanes each include a pivotably mounted flap. The trailing edges of the flaps are all connected via activation levers to a unison ring about the outer circumference of the flaps, such that rotation of the unison ring causes the flaps to pivot uniformly. Generally, high bypass ratio turbine engines (i.e. with a bypass ratio greater than three) do not include variable fan inlet guide vanes.

SUMMARY OF THE INVENTION

A turbine engine according to the present invention includes a plurality of variable fan inlet guide vanes. The variable fan inlet guide vanes permit the ability to control engine stability even though the fan-turbine rotor assembly is directly coupled to the axial compressor at a fixed rate. The variable fan inlet guide vane also provides lower starting power requirements and improved fan stability.

According to one feature disclosed herein, the fan inlet guide vanes are actuated from an inner diameter of the fan inlet guide vanes. Because the outer diameter of the fan inlet guide vane flaps would be very large, an outer diameter unison ring would deflect between the point at which the actuator contacts the unison ring and the diametrically opposite flap, thereby reducing the uniformity of the flap actuation. An outer diameter unison ring would also be very heavy.

BRIEF DESCRIPTION OF THE DRAWINGS

Other advantages of the present invention can be understood by reference to the following detailed description when considered in connection with the accompanying drawings wherein:

FIG. 2 is a longitudinal sectional view of the tip turbine engine of FIG. 1 along an engine centerline and a schematic view of an engine controller.

DETAILED DESCRIPTION OF THE PREFERRED EMBODIMENTS

Figure 1:
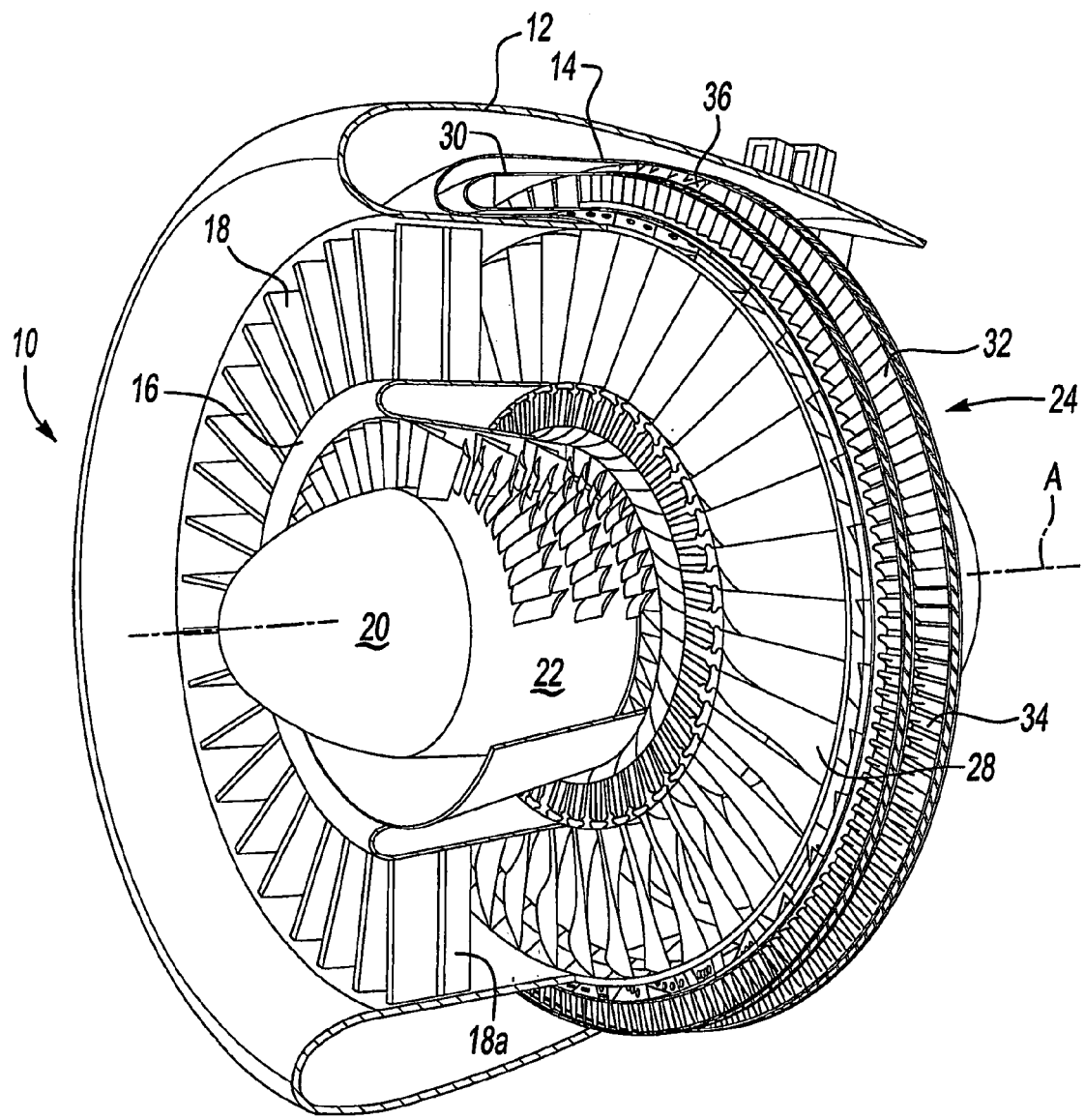
FIG. 1 is a partial sectional perspective view of a tip turbine engine.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each fan inlet guide vane preferably includes a pivotable flap 18A. A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, which is mounted for rotation upon the static inner support housing 42 through an aft bearing assembly 47 and a forward bearing assembly 48. A plurality of compressor blades 52 extends radially outwardly from the axial compressor rotor 46. A fixed compressor case 50 is mounted within the splitter 40. The axial compressor 22 includes a plurality of inlet guide vanes 51 (one shown). For reasons explained below, it is not necessary to provide a variable inlet geometry to the axial compressor 22. Therefore, the inlet guide vane 51 is fixed, thereby reducing the weight and complexity of the axial compressor 22.

A plurality of compressor vanes 54 extends radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example).

The rotational position of the fan inlet guide vane flap 18A is controlled by an actuator 55 that is mounted within the nacelle 12, radially outwardly of one of the fan inlet guide vanes 18 and radially outward of the bypass airflow path. The actuator 55 may be hydraulic, electric motor or linear actuator, or any other type of suitable actuator. The actuator 55 is operatively connected to the fan inlet guide vane flaps 18A via a torque rod 56 that is routed through one of the inlet guide vanes 18. Within the splitter 40, the torque rod 56 is coupled to a unison ring 57 via a torque rod lever 58. The unison ring 57 is rotatable about the engine centerline A. The unison ring 57 is coupled to a shaft 63 of the variable guide vane flap 18a via an activation lever 59. The plurality of variable guide vanes 18 and flaps 18a (only one shown) are disposed circumferentially about the engine centerline A, and each is connected to the unison ring 57 in the same manner. The actuator 55 is coupled to the torque rod 56 by an actuator lever 60.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is diffused and turned once again by the diffuser section 74 toward an axial airflow direction toward the annular combustor 30. Preferably, the airflow is diffused axially forward in the engine 10, however, the airflow may alternatively be communicated in another direction.

The tip turbine engine 10 may optionally include a gearbox assembly 90 aft of the fan-turbine rotor assembly 24, such that the fan-turbine rotor assembly 24 rotatably drives the axial compressor 22 via the gearbox assembly 90. In the embodiment shown, the gearbox assembly 90 provides a speed increase at a 3.34-to-one ratio. The gearbox assembly 90 is an epicyclic gearbox, such as a planetary gearbox as shown, that is mounted for rotation between the static inner support housing 42 and the static outer support housing 44. The gearbox assembly 90 includes a sun gear 92, which rotates the axial compressor rotor 46, and a planet carrier 94, which rotates with the fan-turbine rotor assembly 24. A plurality of planet gears 93 each engage the sun gear 92 and a rotationally fixed ring gear 95. The planet gears 93 are mounted to the planet carrier 94. The gearbox assembly 90 is mounted for rotation between the sun gear 92 and the static outer support housing 44 through a gearbox forward bearing 96 and a gearbox rear bearing 98. The gearbox assembly 90 may alternatively, or additionally, reverse the direction of rotation and/or may provide a decrease in rotation speed.

A plurality of exit guide vanes 108 are located between the static outer support housing 44 and the rotationally fixed exhaust case 106 to guide the combined airflow out of the engine 10. An exhaust mixer 110 mixes the airflow from the turbine blades 34 with the bypass airflow through the fan blades 28.

An upstream pressure sensor 130 measures pressure upstream of the fan blades 28 and a downstream pressure sensor 132 measures pressure downstream of the fan blades 28. A rotation speed sensor 134 is mounted adjacent the fan blades 28 to determine the rotation speed of the fan blades 28. The rotation speed sensor 134 may be a proximity sensor detecting the passage of each fan blade 28 to calculate the rate of rotation.

Control of the tip turbine engine 10 is provided by a Full Authority Digital Engine Controller (FADEC) 112 and by a fuel controller 114, both mounted remotely from the tip turbine engine 10 (i.e. outside the nacelle 12) and connected to the tip turbine engine 10 by a single wiring harness 116 and a single fuel line 118, respectively. The FADEC 112 includes a power source 120 such as a battery, a fuel cell, or other electric generator. The FADEC 112 includes a CPU 122 and memory 124 for executing control algorithms to generate control signals to the tip turbine engine 10 and the fuel controller 114 based upon input from the upstream pressure sensor 130, the downstream pressure sensor 132 and the rotation speed sensor 134. The control signals may include signals for controlling the position of the flaps 18A of the fan inlet guide vanes 18, commands that are sent to the fuel controller 114 to indicate the amount of fuel that should be supplied and other necessary signals for controlling the tip turbine engine 10.

The fuel controller 114 also includes a power source 138, such as a battery, fuel cell, or other electric generator. The fuel controller 114 includes at least one fuel pump 140 for controlling the supply of fuel to the tip turbine engine 10 via fuel line 118.

During operation, core airflow enters the axial compressor 22, where it is compressed by the compressor blades 52. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 by the diffuser section 74 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn rotatably drives the axial compressor 22 either directly or via the optional gearbox assembly 90. The fan-turbine rotor assembly 24 discharges fan bypass air axially aft to merge with the core airflow from the turbine 32 in the exhaust case 106.

The FADEC 112 controls bypass air flow and impingement angle by varying the fan inlet guide vane flaps 18A based upon information in signals from the upstream pressure sensor 130, the downstream pressure sensor 132 and the rotation speed sensor 134. The sensors 130, 132, 134 indicate a current operating state of the tip turbine engine 10. The FADEC 112 determines a desired operating state for the tip turbine engine 10 and generates control signals to bring the tip turbine engine 10 toward the desired operating state. These control signals include control signals for varying the fan inlet guide vanes 18.

Closing the fan inlet guide vane flaps 18A during starting of the tip turbine engine 10 reduces the starter power requirements, while maintaining core airflow. During operation, the FADEC 112 controls the axial compressor 22 operability and stability margin by varying the fan inlet guide vane flaps 18A. In the tip turbine engine 10, the fan blades 28 are coupled to the axial compressor 22 at a fixed rate via the gearbox 90 (or, alternatively, directly). Therefore, slowing the rotation of the fan blades 28 by closing the fan inlet guide vane flaps 18A slows rotation of the axial compressor 22. Additionally, controllably slowing down rotation of the fan blades 28 also reduces the centrifugal compression of the core airflow in the fan blades 28 heading toward the combustor 30, which thereby reduces the output of the combustor 30 and the force with which the turbine 32 is rotated. By significantly altering the speed-flow relationship of the primary propulsor, the combustor temperature relationship changes in a way that allows control of the primary compressor operating lines. This is driven by the relationship between compressor exit corrected flow and high-pressure turbine inlet corrected flow. In typical gas turbine engines, the high-pressure turbine is typically choked and operates at a constant inlet corrected flow. This combined with the fact that flow is usually proportional to speed and combustor temperature ratio is typically constant drives primary compressors to require some sort of variable geometry or bleed to maintain stability. By altering the fan speed-flow characteristic through use of the fan variable inlet guide vanes 18, one can significantly alter the combustor temperature ratio, thereby controlling the primary compressor operating lines and establishing stability without compressor variable geometry or bleed.

FIGS. 1 and 2 are generally scale drawings. The tip turbine engine 10 shown is a high-bypass ratio turbine engine, with a bypass ratio of 5.0.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for ease of reference in dependent claims and do not signify a required sequence of performance unless otherwise indicated.

The invention claimed is:

1. A turbine engine comprising:
   a fan including a plurality of fan blades, the fan rotatable about an axis;
   a combustor for generating a high-energy gas stream;
   a turbine for rotatably driving the fan, the turbine rotatably drivable by the high-energy gas stream;
   a plurality of vane portions, each having a leading edge and a trailing edge, wherein the leading edges are upstream of the trailing edges;
   a plurality of pivotable flaps adjacent the trailing edges of the vane portions, each flap including a trailing edge away from the vane portion, each flap having a radial outer end and a radial inner end, each radial inner end including a connector for connecting to an actuator to pivot the flap relative to the vane portion, the plurality of flaps disposed about the axis, each flap extending from the radial inner end in a direction away from the axis toward the radial outer end, the plurality of vane portions and flaps disposed upstream of the plurality of fan blades; and
   a linkage connected to the connector at the radial inner end of the flap, wherein the linkage includes a unison ring connected to the connectors of the flaps, such that rotation of the unison rings causes pivoting of the plurality of flaps.

2. The turbine engine of claim 1 wherein the connector is proximate the trailing edge of the flap.

3. The turbine engine of claim 1 wherein the flap is pivotably mounted to the vane portion.

4. The turbine engine of claim 1 wherein the flaps are disposed downstream from their respective vanes.

* * * * *